(12) United States Patent
Chang

(10) Patent No.: US 9,571,147 B1
(45) Date of Patent: Feb. 14, 2017

(54) PORTABLE STORAGE BUCKLING UNIT

(71) Applicant: Chi-Yuan Chang, Taichung (TW)

(72) Inventor: Chi-Yuan Chang, Taichung (TW)

( * ) Notice: Subject to any disclaimer, the term of this patent is extended or adjusted under 35 U.S.C. 154(b) by 0 days.

(21) Appl. No.: 15/007,197

(22) Filed: Jan. 26, 2016

(51) Int. Cl.
| | |
|---|---|
| *H04M 11/00* | (2006.01) |
| *H04M 1/00* | (2006.01) |
| *H04B 1/3827* | (2015.01) |
| *A45C 11/00* | (2006.01) |
| *A45F 5/00* | (2006.01) |

(52) U.S. Cl.
CPC .............. *H04B 1/385* (2013.01); *A45C 11/00* (2013.01); *A45F 5/00* (2013.01); *A45C 2011/002* (2013.01)

(58) Field of Classification Search
CPC ................................ H04M 1/102; H04B 1/385
USPC ... 455/404.1, 573, 575.6, 575.8; 379/433.13, 446, 454; D14/138 AA, 138 R
See application file for complete search history.

(56) References Cited

U.S. PATENT DOCUMENTS

| | | | | |
|---|---|---|---|---|
| 6,728,556 B1 * | 4/2004 | Whitley | .................... | A45F 5/00 455/100 |
| D494,556 S * | 8/2004 | Brewer | ................ | D14/138 AA |
| D508,738 S * | 8/2005 | Lodato | ..................... | D14/138 R |
| 6,934,517 B2 * | 8/2005 | Fujihashi | ................ | H04M 1/05 379/433.13 |
| 6,978,160 B2 * | 12/2005 | Hutchison | .............. | H04B 1/385 455/573 |
| 6,993,370 B2 * | 1/2006 | Chen | .......................... | A45F 5/02 379/446 |
| 7,162,281 B2 * | 1/2007 | Kim | .......................... | A45F 5/02 224/196 |
| 7,235,747 B1 * | 6/2007 | Tribou | ................... | G01G 21/23 177/148 |
| 7,397,437 B2 * | 7/2008 | Hasumi | .............. | G04B 37/1486 343/718 |
| 7,424,110 B1 * | 9/2008 | Whiten, III | ............... | A45F 5/00 379/454 |
| D646,052 S * | 10/2011 | Phelps | ......................... | D3/218 |
| 8,140,131 B1 * | 3/2012 | Green | .................... | H04B 1/385 368/10 |
| 8,249,547 B1 * | 8/2012 | Fellner | ............... | G08B 21/0446 455/404.1 |
| 2004/0029623 A1 * | 2/2004 | Ellis | ......................... | A45F 5/00 455/575.8 |
| 2005/0009584 A1 * | 1/2005 | Park | ....................... | H04B 1/385 455/575.6 |
| 2005/0277452 A1 * | 12/2005 | Pasamba | ................ | H04B 1/385 455/575.6 |
| 2006/0166720 A1 * | 7/2006 | Dixon | .................... | H04B 1/385 455/575.6 |
| 2009/0088230 A1 * | 4/2009 | Park | ........................ | C02F 1/325 455/575.6 |
| 2011/0053666 A1 * | 3/2011 | Kang | ...................... | H04M 1/02 455/575.6 |

* cited by examiner

*Primary Examiner* — William D Cumming

(57) ABSTRACT

A portable storage apparatus includes a wrapping unit, a buckling unit, a clawing unit and a holder. The wrapping unit is adapted for wrapping a user's arm. The buckling unit is attached to the wrapping unit. The holder is adapted for holding a portable electronic device. The clawing unit is attached to the holder. The clawing unit can be engaged with and disengaged from the buckling unit. Hence, the holder can be attached to and detached from the wrapping unit.

20 Claims, 10 Drawing Sheets

PORTABLE STORAGE BUCKLING UNIT

BACKGROUND OF INVENTION

1. Field of Invention

The present invention relates to a storage apparatus and, more particularly, to a portable storage apparatus.

2. Related Prior Art

A portable electronic device such as a cell phone can be placed in a handbag. However, it is undesirable or inconvenient to bring a handbag sometimes.

A cell phone can be placed in a holder equipped with a clip, hook or loop for attachment to a belt for a pair of trousers. However, a user does not wear any belt in his or her sports clothing.

A cell phone can be placed in a bag equipped with a necklace to be hung on a user's neck. However, the bag inevitably dangles and makes the user uncomfortable. Sometimes, the necklace gets tangled with an external object and interferes with the user's action. The user might even get hurt because of such interference.

A cell phone can be placed in a bag equipped with two straps and hook-and-loop means for wrapping a user's arm. To use the cell phone, the user can keep the cell phone in the bag and take them from his or her arm. After using the cell phone, the user attaches the bag and the cell phone back to his or her arm via operating the hook-and-look means and the straps, and this is inconvenient. Alternatively, to use the cell phone, the user can keep the bag on his or her arm and take the cell phone from the bag, and this is inconvenient.

The present invention is therefore intended to obviate or at least alleviate the problems encountered in prior art.

SUMMARY OF INVENTION

It is the primary objective of the present invention to provide a convenient portable storage apparatus for a cell phone.

To achieve the foregoing objective, the portable storage apparatus includes a wrapping unit, a buckling unit, a holder and a clawing unit. The wrapping unit includes at least one lateral strap for wrapping an external object. The buckling unit includes a shell, a movable tongue and at least one spring. The shell is attached to the lateral strap and made with a stationary tongue on a side, a window, and at least one ledge on an opposite side. The movable tongue is movable between an extended position and a withdrawn position and made with a portion extending throughout the window. The spring is compressed between the movable tongue and the ledge. The holder is adapted for holding a portable electronic device. The clawing unit is attached to the holder and made with a cavity and recesses in communication with the cavity in a radial direction. The recesses are adapted for receiving the movable tongue and the stationary tongue. The movable tongue is at a distance from the stationary tongue larger than a diameter of the cavity in the extended position. The movable tongue is at a distance from the stationary tongue smaller than the diameter of the cavity in the withdrawn position.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 11:
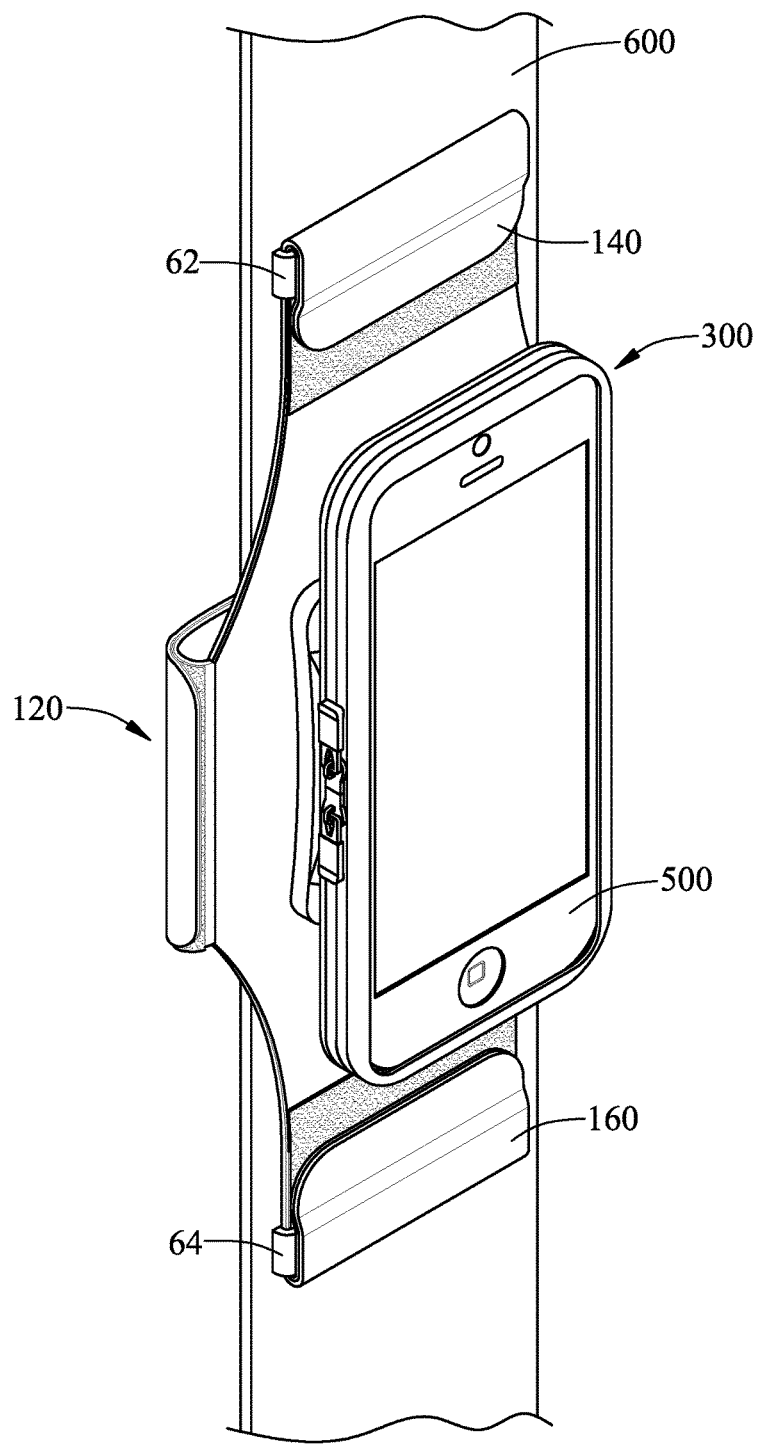
FIG. 11 is a perspective view of a belt for supporting the portable storage apparatus shown in FIG. 2.
Figure 12:
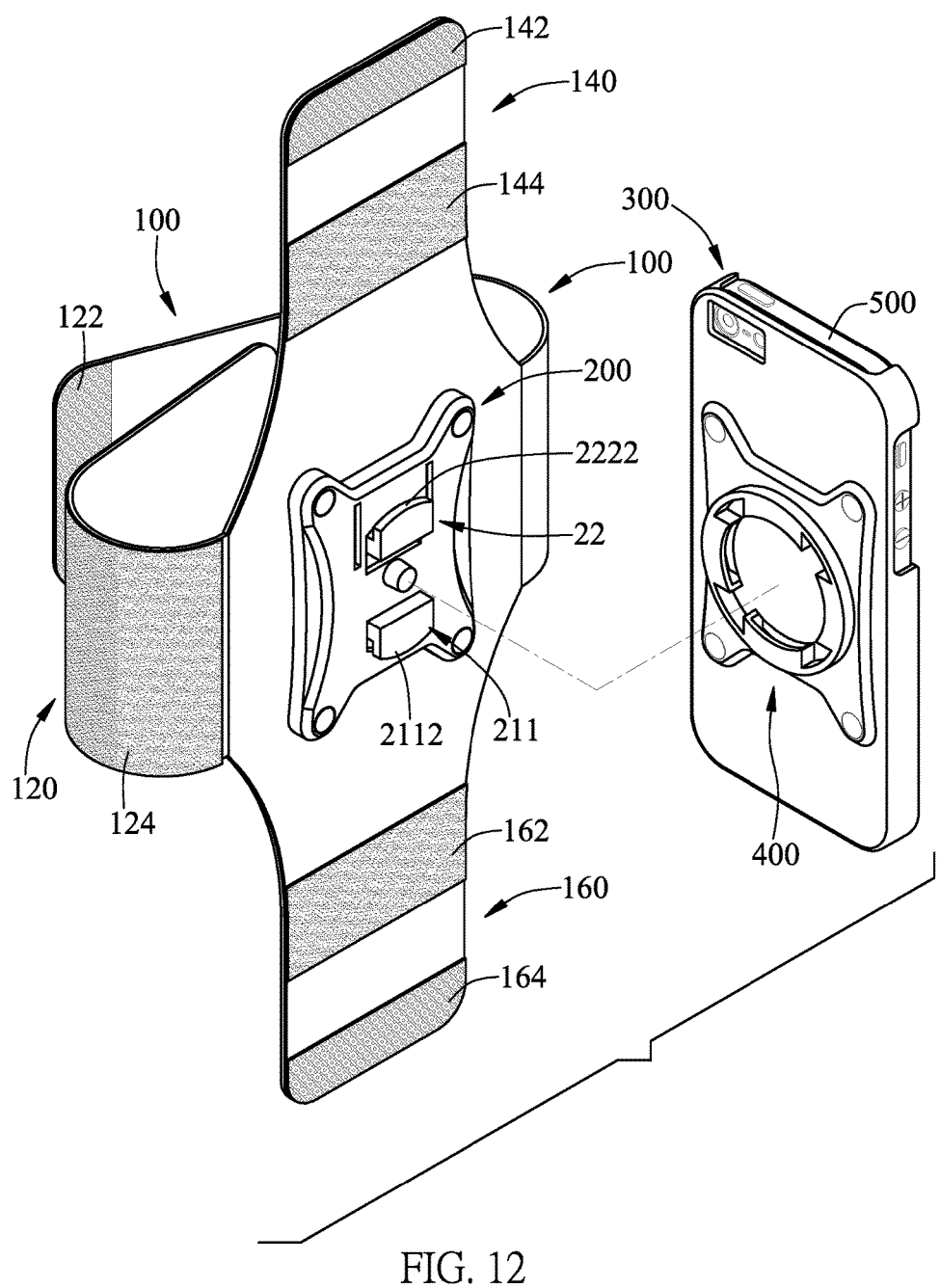
FIG. 12 is an exploded view of a portable storage apparatus according to the second embodiment of the present invention.

Referring to FIGS. 1 through 5, a portable electronic device 500 such as a cell phone and a smart phone is held by a portable storage apparatus according to a first embodiment of the present invention. The portable storage apparatus includes a wrapping unit 100, a buckling unit 200, a holder 300, and a clawing unit 400. The buckling unit 200 is secured to the wrapping unit 100 by several rivets for example. The clawing unit 400 is secured to the holder 300 by several rivets for example. The wrapping unit 100 is adapted for wrapping a user's arm or a belt 600 (FIG. 11). The holder 300 is adapted for holding the portable electronic device 500. The clawing unit 400 can easily be engaged with the buckling unit 200 to keep the portable electronic device 500 on the user's arm or the belt 600. To use the portable electronic device 500, the clawing unit 400 can easily be disengaged from the buckling unit 200 to take the portable electronic device 500 from the user's arm or the belt 600.

The wrapping unit 100 is a cruciform elastic strip including a central portion, two lateral straps 120, an upper strap 140 and a lower strap 160. The upper strap 140 and the lower strap 160 can however be omitted in another embodiment.

The lateral straps 120 extend from the central portion of the wrapping unit 100 in opposite senses of direction. The lateral straps 120 are adapted for wrapping the arm or the belt 600. One of the lateral straps 120 is provided with tiny hooks 122. The other lateral strap 120 is provided with tiny loops 124. The tiny hooks 122 can be engaged with and disengaged from the tiny loops 124. Together, the tiny hooks 122 and the tiny loops 124 become first hook-and-loop means for connecting the lateral straps 120 to each other.

The upper strap 140 and the lower strap 160 extend from the central portion of the wrapping unit 100 in opposite senses of direction. The upper strap 140 includes a portion provided with tiny hooks 142 and another portion provided with tiny loops 144. The tiny hooks 142 can be engaged with and disengaged from the tiny loops 144. Together, the tiny hooks 142 and the tiny loops 144 become second hook-and-loop means for interconnecting the portions of the upper strap 140. The lower strap 160 includes a portion provided with tiny hooks 162 and another portion provided with tiny loops 164. The tiny hooks 162 can be engaged with and disengaged from the tiny loops 164. Together, the tiny hooks 162 and the tiny loops 164 become third hook-and-loop means for interconnecting the portions of the lower strap 160.

The buckling unit 200 is secured to a front side of the central portion of the wrapping unit 100. The buckling unit 200 includes a shell 21, a movable tongue 22, two springs 23 and a cover 24.

The shell 21 is made with a stationary tongue 211, a window 212, a space 213, two flanges 214 and two ledges 215. The stationary tongue 211 is a bent element made with a stem (not numbered) perpendicularly extending from a front side of the shell 21 and a tip 2112 perpendicularly extending from the stem so that the tip 2112 extends parallel to the shell 21. The window 212 is made in an upper portion of the shell 21. The space 213 is in communication with the window 212. The space 213 is defined by the flanges 214 that extend on a rear side of the shell 21 so that the window 212 is located between the flanges 214. Each of the flanges 214 includes a stem 2141 and a fin 2142. The stem 2141 perpendicularly extends from the shell 21. The fin 2142 perpendicularly extends from the stem 2141. The ledges 215 are formed on the rear side of the shell 21. Each of the ledges 215 is a U-shaped element made with an aperture 2151.

The movable tongue 22 includes a sliding plate 221, a stem 222, a tip 2222, a slot 223 and two rods 224. The sliding plate 221 is movably inserted in the space 213 of the shell 21 so that the movable tongue 22 is movable between an extended position and a withdrawn position. The sliding plate 221 includes two edges (not numbered) restrained by the flanges 214. The stem 222 perpendicularly extends from the sliding plate 221 while the tip 2222 perpendicularly extends from the stem 222 thereof so that the tip 2222 extends parallel to the sliding plate 221. The stem 222 extends out of the shell 21 through the window 212. The tip 2222 extends opposite to the tip 2112. The slot 223 is made in the sliding plate 221, below the stem 222. The rods 224 extend downwards from a lower edge of the sliding plate 221. Each of the rods 224 extends throughout the aperture 2151 of a corresponding one of the ledges 215. Each of the springs 23 is provided on a corresponding one of the rods 224 and compressed between the corresponding ledge 215 and the lower edge of the sliding plate 221 of the movable tongue 22.

The cover 24 is attached to the shell 21 by a screw (not numbered) that extends the slot 223 of the movable tongue 22 to keep a lower portion of the sliding plate 221 between the cover 24 and the shell 21 and retain the springs 23 on the ledges 215.

The holder 300 is shaped in compliance with the portable electronic device 500. The holder 300 is in the form of a bag that includes a front strip 31, a rear strip 32 and a zipper 33. A portion of the front strip 31 is connected to a corresponding portion of the rear strip 32, with a space (not numbered) defined between them. The zipper 33 is used to close the front strip 31 and the rear strip 32. The space of the holder 300 is adapted for containing the portable electronic device 500. The front strip 31 is transparent to allow the portable electronic device 500 to be seen. Hence, the portable electronic device 500 can be operated without having to be taken out of the holder 300.

Figure 1:
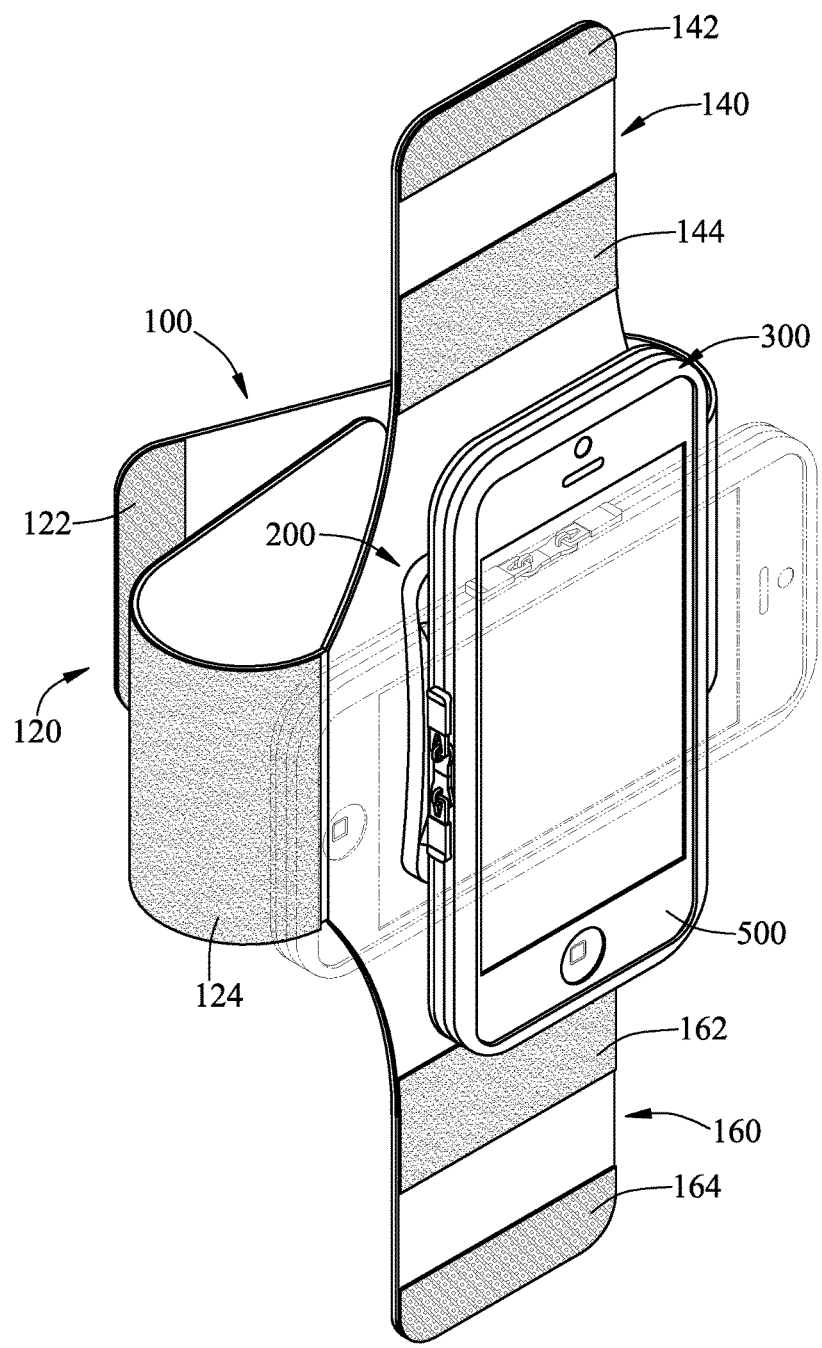
FIG. 1 is a perspective view of a portable electronic device held by a portable storage apparatus according to the preferred embodiment of the present invention.
Figure 2:
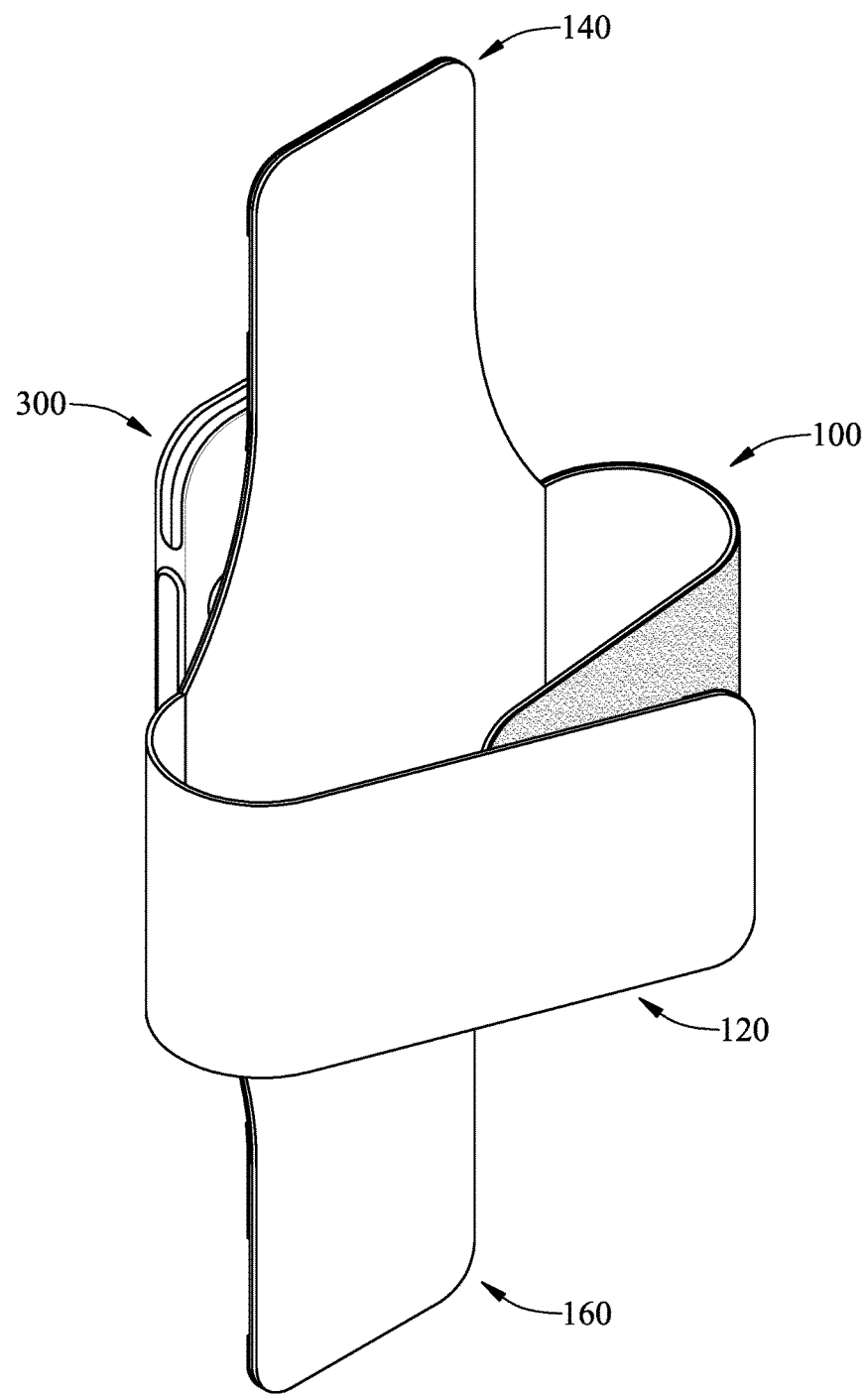
FIG. 2 is another perspective view of the portable storage apparatus shown in FIG. 1.
Figure 3:
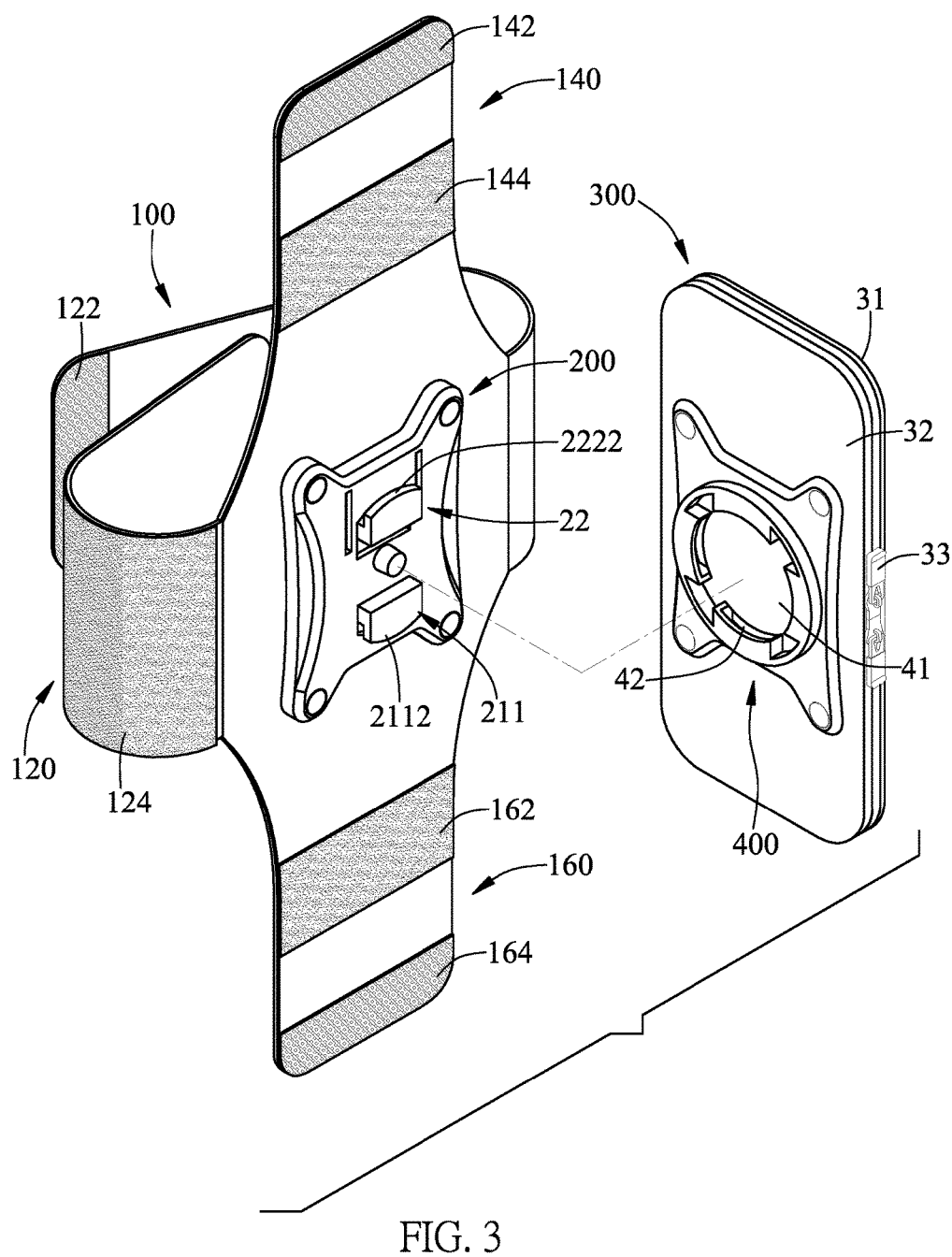
FIG. 3 is an exploded view of the portable storage apparatus shown in FIG. 2.

Referring to FIG. 3, the clawing unit 400 is secured to a rear side of the holder 300. The clawing unit 400 includes a cavity 41 and four recesses 42 in communication with the cavity 41. The recesses 42 are arranged in pairs. The recesses 42 are shaped in compliance with the tips 2222 and 2112. In the extended position of the movable tongue 22, a distance of the stem 222 of the movable tongue 22 from the tip 2112 of the stationary tongue 211 is larger than the diameter of the cavity 41. In the withdrawn position of the movable tongue 22, the distance of the stem 222 of the movable tongue 22 from the tip 2112 of the stationary tongue 211 is smaller than the diameter of the cavity 41.

In use, the lateral straps 120 of the wrapping unit 100 are used to wrap the user's arm. The first hook-and-loop means is used to keep the lateral straps 120 in the form of a loop around the user's arm.

The portable electronic device 500 is held in the holder 300. The clawing unit 400, which is secured to the rear side of the holder 300, is engaged with or disengaged from buckling unit 200, which is secured to the wrapping unit 100. Thus, the holder 300 is attached to or detached from the wrapping unit 100.

Figure 7:
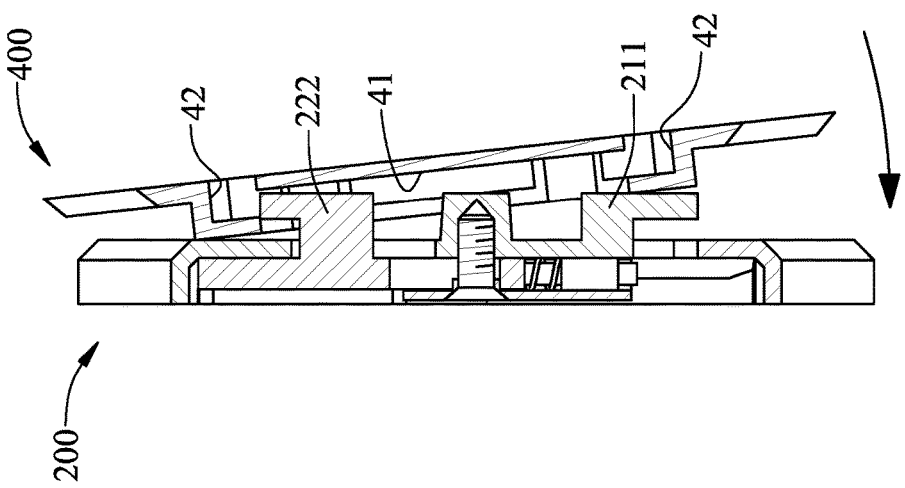
FIG. 7 is a cross-sectional and partial view of the portable storage apparatus shown in FIG. 2.

Referring to FIG. 7, the attachment of the holder 300 to the wrapping unit 100 will be described. To this end, the holder 300 is moved relative to the wrapping unit 100 to insert the tip 2222 of the movable tongue 22 of the buckling unit 200 in one of the recesses 42 of the clawing unit 400.

Figure 6:
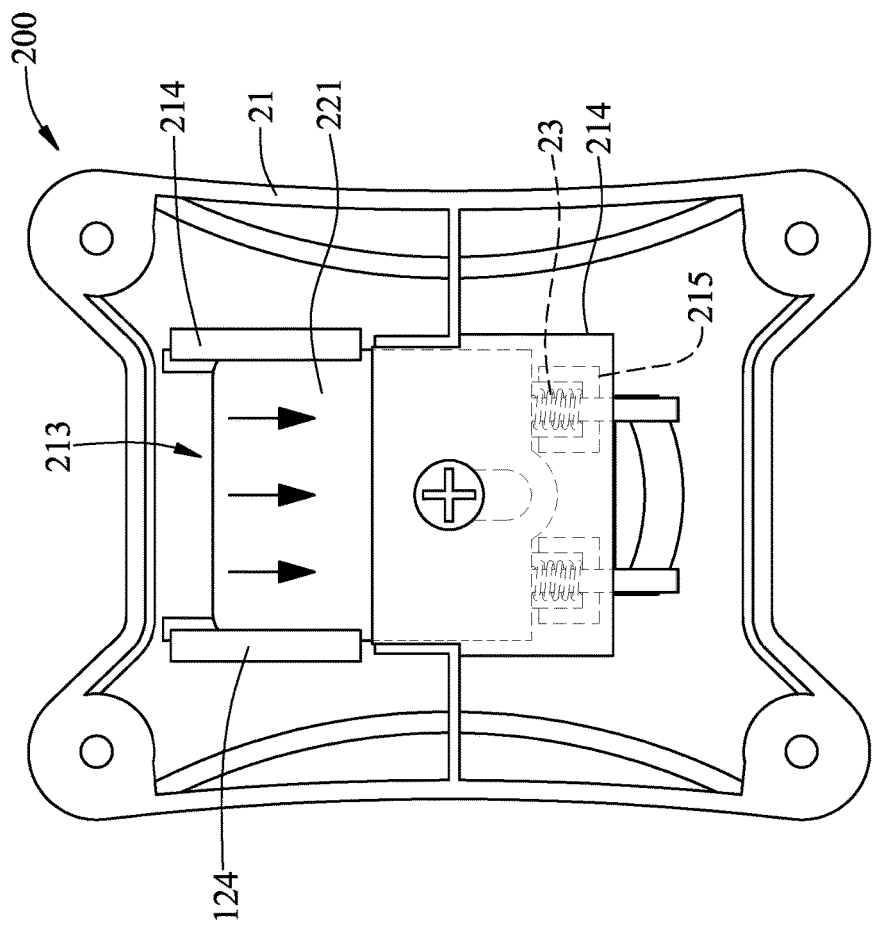
FIG. 6 is a rear view of the buckling unit shown in FIG. 5.
Figure 8:
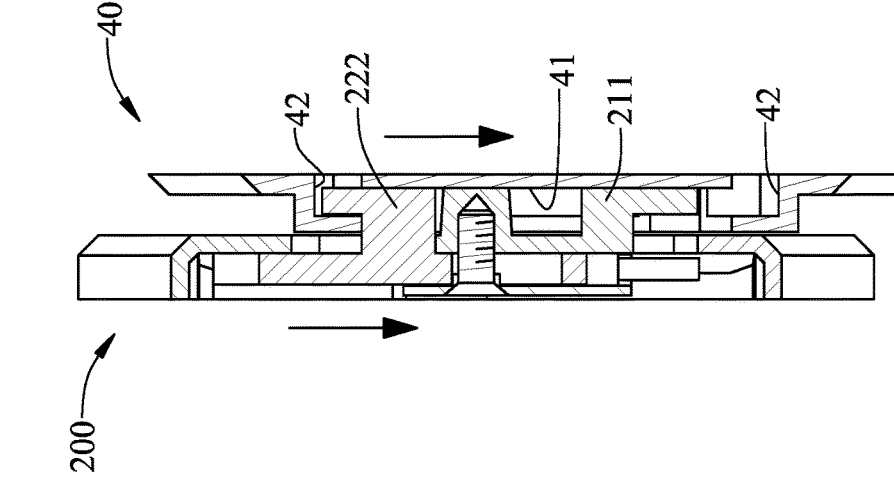
FIG. 8 is a cross-sectional and partial view of the portable storage apparatus in another position than shown in FIG. 7.

Referring to FIGS. 6 and 8, the holder 300 is moved downwards relative to the wrapping unit 100 to press the movable tongue 22 to the withdrawn position, i.e., the sliding plate 221 is moved downwards in the space 213 of the shell 21 while the springs 23 are compressed. Now, the distance of the stem 222 of the movable tongue 22 from the tip 2112 of the stationary tongue 211 is smaller than the diameter of the cavity 41. Hence, the holder 300 can be swung toward the wrapping unit 100 to insert the tip 2222 in the cavity 41.

Figure 9:
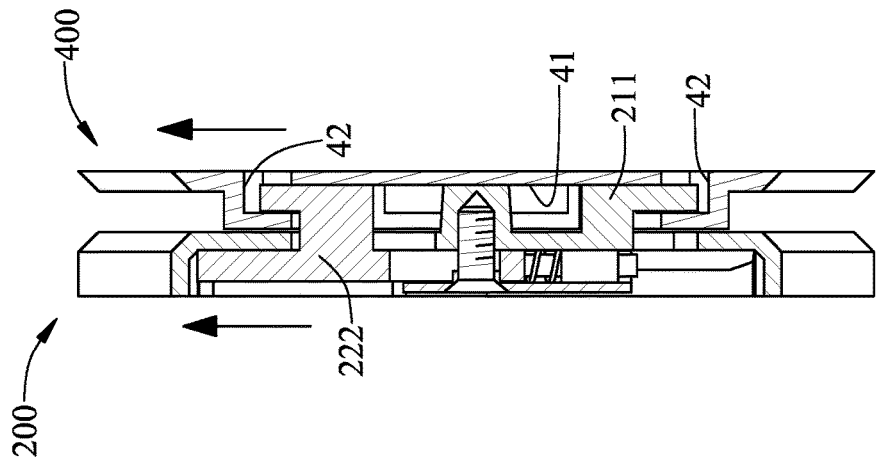
FIG. 9 is a cross-sectional and partial view of the portable storage apparatus in another position than shown in FIG. 8.
Figure 10:
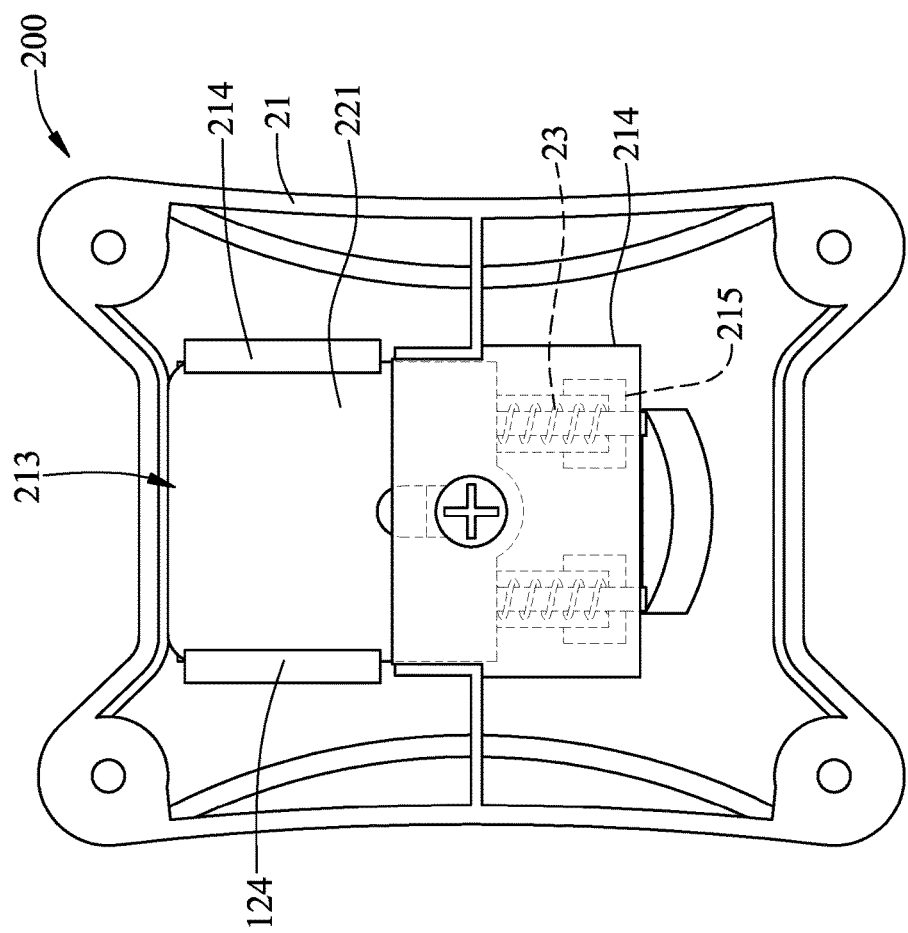
FIG. 10 is a rear view of the buckling unit in another position than shown in FIG. 7.

Referring to FIGS. 9 and 10, the holder 300 is released, thus allowing the springs 23 to push the sliding plate 221 upwards in the space 213 and hence return the movable tongue 22 to the extended position. Hence, the tip 2222 of the movable tongue 22 of the buckling unit 200 is inserted in an opposite one of the recesses 42. Now, the holder 300 is attached to the wrapping unit 100.

To detach the holder 300 from the wrapping unit 100, the sliding plate 221 is moved downwards in the space 213, i.e., the movable tongue 22 is moved to the withdrawn position. The tip 2112 of the stationary tongue 211 is removed from all of the recesses 42. Then, the holder 300 is swung from the wrapping unit 100 to move the tip 2222 from the cavity 41. Finally, the holder 300 is moved upwards relative to the wrapping unit 100 so that the holder 300 is removed from the wrapping unit 100 and available for use.

Referring to FIG. 11, the wrapping unit 100 is used to wrap the belt 600 of a backpack for example. The lateral straps 120 are used to wrap the belt 600. The first hook-and-loop means is used to keep the lateral straps 120 around the belt 600. The upper strap 140 is used to wrap a loop 62 attached to the belt 600. The second hook-and-loop means is used to keep the upper strap 140 around the loop 62. The lower strap 160 is used to wrap a loop 64 attached to the belt 600. The third hook-and-loop means is used to keep the lower strap 160 around the loop 64.

Figure 4:
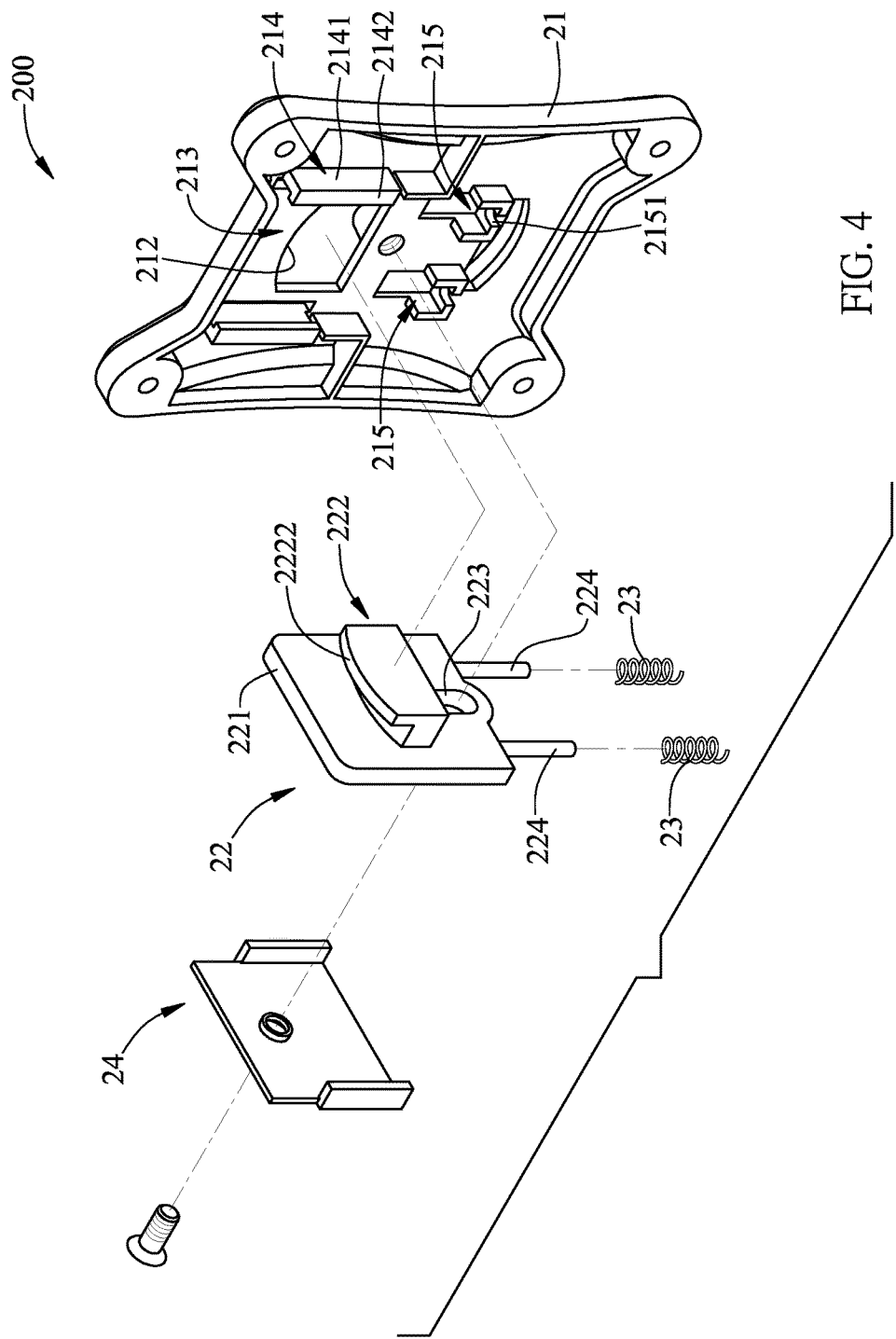
FIG. 4 is an exploded view of a buckling unit of the portable storage apparatus shown in FIG. 2.
Figure 5:
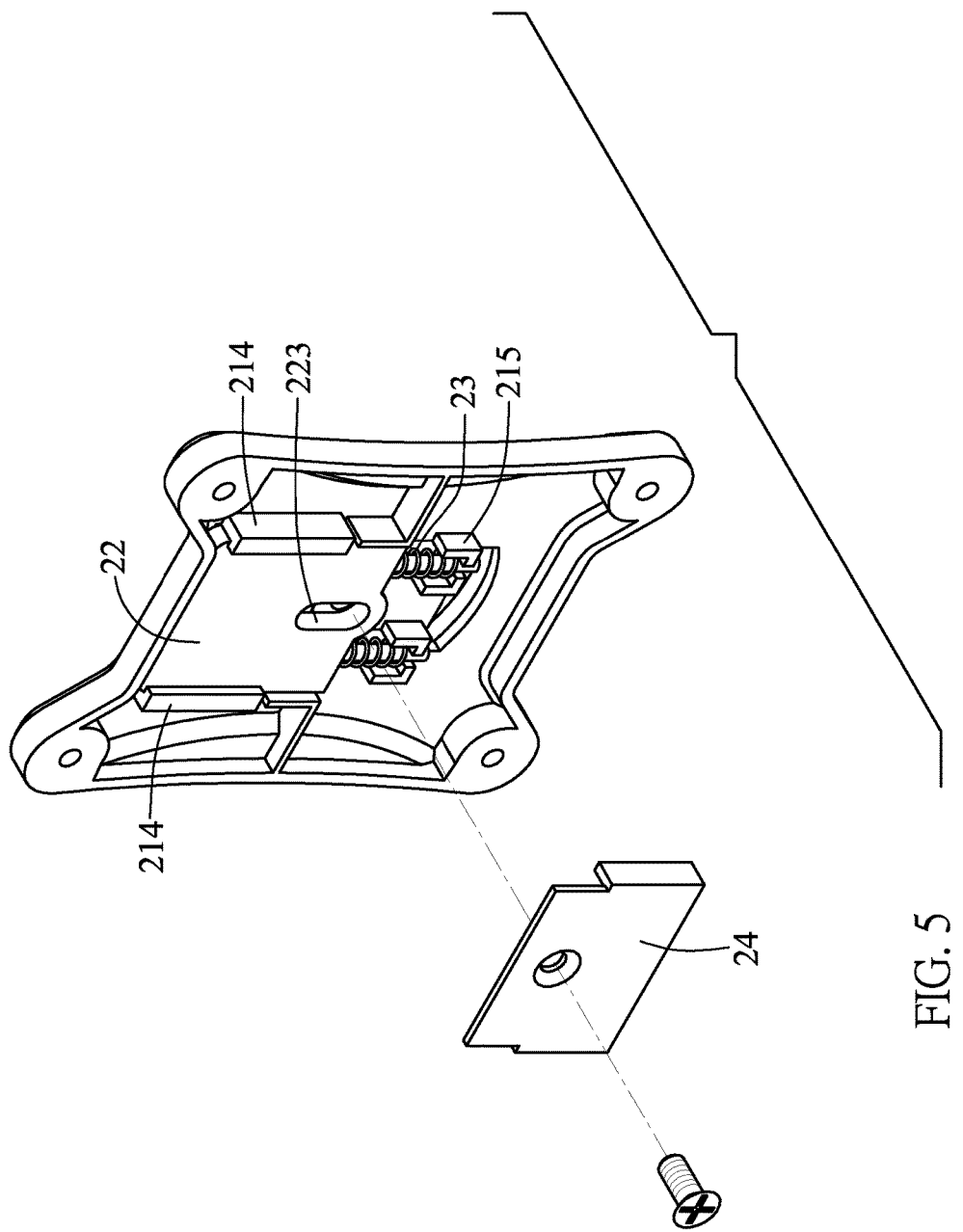
FIG. 5 is another exploded view of the buckling unit illustrated in FIG. 4.

Referring to FIG. 4, there is a portable storage apparatus according to a second embodiment of the present invention. The second embodiment is identical to the first embodiment except that the holder 300 is in the form of a frame that is shaped in compliance with the portable electronic device 500. Thus, the holder 300 is adapted for elastically holding the portable electronic device 500.

The present invention has been described via the detailed illustration of the embodiment. Those skilled in the art can derive variations from the embodiments without departing from the scope of the present invention. Therefore, the embodiments shall not limit the scope of the present invention defined in the claims.

The invention claimed is:

1. A portable storage apparatus comprising:
   a wrapping unit comprising two lateral straps for wrapping an external object;
   a buckling unit comprising:
   a shell attached to the wrapping unit and made with a stationary tongue on a side, a window, and at least one ledge on an opposite side;
   a movable tongue movable between an extended position and a withdrawn position and made with a portion extending throughout the window; and
   at least one spring compressed between the movable tongue and the ledge;
   a holder for holding a portable electronic device; and
   a clawing unit attached to the holder and made with a cavity and recesses in communication with the cavity in a radial direction, wherein the recesses are adapted for receiving the movable tongue and the stationary tongue, wherein the movable tongue is at a distance from the stationary tongue larger than a diameter of the cavity in the extended position, wherein the movable tongue is at a distance from the stationary tongue smaller than the diameter of the cavity in the withdrawn position.

2. The portable storage apparatus according to claim 1, wherein the shell further comprises a space for movably receiving a portion of the movable tongue.

3. The portable storage apparatus according to claim 2, wherein the movable tongue comprises a sliding plate kept movable in the space by the flanges, the stationary tongue, a stem extending out of the shell from the sliding plate via the window, and a tip extending from the stem.

4. The portable storage apparatus according to claim 3, wherein the ledge comprises an aperture, wherein the sliding plate comprises at least one rod extending in the aperture through the spring.

5. The portable storage apparatus according to claim 4, wherein the buckling unit further comprises a cover attached to the shell so that a portion of the sliding plate is kept between the cover and the shell and that the rod is kept in the aperture.

6. The portable storage apparatus according to claim 5, wherein the sliding plate further comprises a slot through which a screw is inserted in the shell.

7. The portable storage apparatus according to claim 2, wherein the shell further comprises two flanges so that the space is defined between the flanges.

8. The portable storage apparatus according to claim 7, wherein the movable tongue comprises a sliding plate kept movable in the space by the flanges, the stationary tongue, a stem extending out of the shell from the sliding plate via the window, and a tip extending from the stem.

9. The portable storage apparatus according to claim 8, wherein the ledge comprises an aperture, wherein the sliding plate comprises at least one rod extending in the aperture through the spring.

10. The portable storage apparatus according to claim 9, wherein the buckling unit further comprises a cover attached to the shell so that a portion of the sliding plate is kept between the cover and the shell and that the rod is kept in the aperture.

11. The portable storage apparatus according to claim 10, wherein the sliding plate further comprises a slot through which a screw is inserted in the shell.

12. The portable storage apparatus according to claim 1, wherein the wrapping unit further comprises hook-and-loop means for interconnecting the lateral straps.

13. The portable storage apparatus according to claim 1, wherein the holder is a bag.

14. The portable storage apparatus according to claim 13, wherein the holder comprises a front strip, a rear strip connected to the front strip so that a space is defined between the front and rear strips, and a zipper for closing the front and rear strips.

15. The portable storage apparatus according to claim 1, wherein the holder is a frame.

16. The portable storage apparatus according to claim 1, wherein each of the recesses are arranged in at least one pair.

17. The portable storage apparatus according to claim 1, wherein the wrapping unit further comprises an upper strap for wrapping an external object.

18. The portable storage apparatus according to claim 17, wherein the wrapping unit further comprises other hook-and-loop means for interconnecting two portions of the upper strap.

19. The portable storage apparatus according to claim 16, wherein the wrapping unit further comprises a lower strap for wrapping another external object.

20. The portable storage apparatus according to claim 19, wherein the wrapping unit further comprises other hook-and-loop means for interconnecting two portions of the lower strap.

* * * * *